US011259263B2

(12) United States Patent
Sagar et al.

(10) Patent No.: US 11,259,263 B2
(45) Date of Patent: Feb. 22, 2022

(54) DUAL REGISTRATION USING DYNAMIC SPECTRUM SHARING (DSS) IN A WIDE AREA NETWORK (WAN)

(71) Applicant: QUALCOMM Incorporated, San Diego, CA (US)

(72) Inventors: Sagar, Hyderabad (IN); Avinash Kumar Dubey, Hyderabad (IN); Mohammad Suhel Ashfaque, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/810,797

(22) Filed: Mar. 5, 2020

(65) Prior Publication Data

US 2021/0282104 A1 Sep. 9, 2021

(51) Int. Cl.
*H04W 60/00* (2009.01)
*H04W 8/24* (2009.01)
*H04W 16/14* (2009.01)
*H04W 76/15* (2018.01)

(52) U.S. Cl.
CPC .......... *H04W 60/005* (2013.01); *H04W 8/24* (2013.01); *H04W 16/14* (2013.01); *H04W 76/15* (2018.02)

(58) Field of Classification Search
CPC ..... H04W 60/005; H04W 76/15; H04W 8/24; H04W 6/114

USPC .................................. 370/328–329, 331–332
See application file for complete search history.

(56) References Cited

U.S. PATENT DOCUMENTS

| | | | | |
|---|---|---|---|---|
| 2019/0013881 A1* | 1/2019 | Olesen | .................. | H04W 16/14 |
| 2019/0037579 A1* | 1/2019 | Yi | ........................... | H04L 5/001 |
| 2020/0059796 A1* | 2/2020 | Ghosh | .................... | H04W 16/14 |
| 2020/0337054 A1* | 10/2020 | Kwok | ............... | H04W 72/0486 |
| 2020/0358481 A1* | 11/2020 | Huss | ................. | H04W 72/0446 |
| 2020/0413325 A1* | 12/2020 | Meredith | .............. | H04W 48/18 |
| 2021/0058953 A1* | 2/2021 | Bendlin | ........... | H04W 72/1273 |
| 2021/0144561 A1* | 5/2021 | Chaturvedi | .......... | H04L 5/0098 |
| 2021/0250773 A1* | 8/2021 | Bhaskaran | ........... | H04W 16/14 |

* cited by examiner

*Primary Examiner* — Congvan Tran
(74) *Attorney, Agent, or Firm* — Qualcomm Incorporated

(57) ABSTRACT

This disclosure provides systems, methods, and apparatus, including computer programs encoded on computer-readable media, for implementing a dual registration mode and a dual receive mode using a single radio for wireless communications. A UE may determine that a wireless communication network supports the dual registration mode and dynamic spectrum sharing (DSS). The UE may establish a first connection with a first base station using a first radio access technology (RAT) of the wireless communication network. The UE may determine, based on one or more parameters associated with the DSS, that a second RAT of the wireless communication network has a second operating frequency band that overlaps a first operating frequency band of the first RAT. The UE may establish, via the second operating frequency band, a second connection with a second base station using the second RAT based on the dual registration mode and the DSS.

30 Claims, 7 Drawing Sheets

500

510 — DETERMINE, BY AN APPARATUS OF A USER EQUIPMENT (UE), THAT A WIRELESS COMMUNICATION NETWORK SUPPORTS A DUAL REGISTRATION MODE AND DYNAMIC SPECTRUM SHARING (DSS)

520 — ESTABLISH A FIRST CONNECTION WITH A FIRST BASE STATION USING A FIRST RADIO ACCESS TECHNOLOGY (RAT) OF THE WIRELESS COMMUNICATION NETWORK, THE FIRST RAT USING A FIRST OPERATING FREQUENCY BAND

530 — DETERMINE, BASED ON ONE OR MORE PARAMETERS ASSOCIATED WITH THE DSS, THAT A SECOND RAT OF THE WIRELESS COMMUNICATION NETWORK HAS A SECOND OPERATING FREQUENCY BAND THAT OVERLAPS THE FIRST OPERATING FREQUENCY BAND OF THE FIRST RAT

540 — ESTABLISH, VIA THE SECOND OPERATING FREQUENCY BAND, A SECOND CONNECTION WITH A SECOND BASE STATION USING THE SECOND RAT BASED ON THE DUAL REGISTRATION MODE AND THE DSS

FIGURE 5

DUAL REGISTRATION USING DYNAMIC SPECTRUM SHARING (DSS) IN A WIDE AREA NETWORK (WAN)

TECHNICAL FIELD

Aspects of the present disclosure relate generally to wireless communication and to techniques for implementing a dual registration mode using dynamic spectrum sharing (DSS) in a wide area network (WAN).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G) or 5G NR. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks typically support both LTE and 5G NR technologies. A UE may communicate with the wireless communication network using LTE or 5G NR, or both LTE and 5G NR. For example, the UE may use 5G NR for some applications, such as data transmissions, and may use LTE for other applications, such as voice transmissions.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method performed by an apparatus of a user equipment (UE) for wireless communication in a dual receive mode using a single radio. The method may include determining that a wireless communication network supports a dual registration mode and dynamic spectrum sharing (DSS). The method may include establishing a first connection with a first base station using a first radio access technology (RAT) of the wireless communication network. The first RAT may use a first operating frequency band. The method may include determining, based on one or more parameters associated with the DSS, that a second RAT of the wireless communication network has a second operating frequency band that overlaps the first operating frequency band of the first RAT. The method may include establishing, via the second operating frequency band, a second connection with a second base station using the second RAT based on the dual registration mode and the DSS.

In some implementations, the first RAT is a 5G New Radio (NR) network and the second RAT is a long term evolution (LTE) network.

In some implementations, the method may include operating in the dual receive mode, a dual standby mode, and the dual registration mode using the single radio for wireless communications via the first connection using the first RAT and the second connection using the second RAT.

In some implementations, the method may include receiving a registration message from the first base station. The registration message may indicate that the wireless communication network supports the dual registration mode.

In some implementations, the registration message may be a registration accept message. The registration accept message may include a dual registration indication that indicates the wireless communication network supports the dual registration mode.

In some implementations, the method of determining that the wireless communication network supports the DSS may include receiving the one or more parameters associated with the DSS from the first base station. The one or more parameters may include a rate matching parameter that indicates the wireless communication network supports the DSS.

In some implementations, the rate matching parameter may be an LTE cell-specific reference signal (CRS) rate matching parameter that indicates the wireless communication network supports the DSS and indicates the second operating frequency band of the second RAT.

In some implementations, the method of establishing the second connection with the second base station using the second RAT based on the dual registration mode and the DSS may include determining the second operating frequency band and a center frequency of the second operating frequency band based on the rate matching parameter, and searching for the center frequency of the second operating frequency band for establishing the second connection.

In some implementations, the method may include operating in an idle mode or a connected mode for the first connection that uses the first RAT, and operating in an idle mode for the second connection that uses the second RAT.

In some implementations, the method may include receiving a first communication associated with the first RAT from the first base station via the first connection having the first operating frequency band, receiving a second communication associated with the second RAT from the second base station via the second connection having the second operating frequency band, processing the first communication using a first processing unit associated with the first RAT, and processing the second communication using a second processing unit associated with the second RAT.

In some implementations, the method may include operating in an idle mode or a connected mode for the first connection that uses the first RAT, operating in an idle mode for the second connection that uses the second RAT, and receiving the second communication associated with the second RAT without performing a tuneaway operation.

In some implementations, the method may include operating in an idle mode or a connected mode for the first connection that uses the first RAT, operating in an idle mode for the second connection that uses the second RAT, and receiving the first communication associated with the first RAT concurrently with the second communication associated with the second RAT without performing a tuneaway operation.

In some implementations, the first RAT may be a 5G New Radio (NR) network and the second RAT may be a long term evolution (LTE) network. The method may include operating in an idle mode or a connected mode for the first connection that uses the 5G NR network, operating in an idle mode for the second connection that uses the LTE network, and determining the second communication is an LTE page signal or an LTE cell-specific reference signal (CRS).

In some implementations, the LTE page signal or the LTE CRS may be associated with an LTE voice transmission.

Another innovative aspect of the subject matter described in this disclosure can be implemented by an apparatus of a UE for wireless communication comprising an interface and one or more processors. The one or more processors, together with the interface, may be configured to determine that a wireless communication network supports a dual registration mode and DSS, and establish a first connection with a first base station using a first RAT of the wireless communication network. The first RAT may use a first operating frequency band. The one or more processors, together with the interface, may be configured to determine, based on one or more parameters associated with the DSS, that a second RAT of the wireless communication network has a second operating frequency band that overlaps the first operating frequency band of the first RAT, and establish a second connection with a second base station using the second RAT based on the dual registration mode and the DSS. The second RAT may use the second operating frequency band.

In some implementations, the interface may include a single radio, and the apparatus may be configured to operate in a dual receive mode, a dual standby mode, and the dual registration mode using the single radio for wireless communications via the first connection using the first RAT and the second connection using the second RAT.

In some implementations, the first RAT may be a 5G NR network and the second RAT may be an LTE network.

In some implementations, the one or more processors, together with the interface, may be further configured to receive a registration message from the first base station. The registration message may indicate that the wireless communication network supports the dual registration mode.

In some implementations, the registration message may be a registration accept message. The registration accept message may include a dual registration indication that indicates the wireless communication network supports the dual registration mode.

In some implementations, the one or more processors, together with the interface, may be further configured to receive the one or more parameters associated with the DSS from the first base station. The one or more parameters may include a rate matching parameter that indicates the wireless communication network supports the DSS.

In some implementations, the rate matching parameter may be an LTE CRS rate matching parameter that indicates the wireless communication network supports the DSS and indicates the second operating frequency band of the second RAT.

In some implementations, the one or more processors, together with the interface, may be further configured to determine the second operating frequency band and a center frequency of the second operating frequency band based on the rate matching parameter, and search for the center frequency of the second operating frequency band to establish the second connection.

In some implementations, the one or more processors, together with the interface, may be further configured to operate in an idle mode or a connected mode for the first connection that uses the first RAT, and operate in an idle mode for the second connection that uses the second RAT.

In some implementations, the one or more processors, together with the interface, may be further configured to receive a first communication associated with first RAT from the first base station via the first connection having the first operating frequency band, receive a second communication associated with the second RAT from the second base station via the second connection having the second operating frequency band, and process the first communication associated with the first RAT; and process the second communication associated with the second RAT.

In some implementations, the one or more processors, together with the interface, may be further configured to operate in an idle mode or a connected mode for the first connection that uses the first RAT, operate in an idle mode for the second connection that uses the second RAT, and receive the first communication associated with the first RAT concurrently with the second communication associated with the second RAT without performing a tuneaway operation.

Another innovative aspect of the subject matter described in this disclosure can be implemented by an apparatus for wireless communication. The apparatus may include means for determining that a wireless communication network supports a dual registration mode and DSS, and means for establishing a first connection with a first base station using a first RAT of the wireless communication network. The first RAT may use a first operating frequency band. The apparatus may include means for determining, based on one or more parameters associated with the DSS, that a second RAT of the wireless communication network has a second operating frequency band that overlaps the first operating frequency band of the first RAT, and means for establishing, via the second operating frequency band, a second connection with a second base station using the second RAT based on the dual registration mode and the DSS.

In some implementations, the apparatus may include means for operating in a dual receive mode, a dual standby mode, and the dual registration mode using a single radio for wireless communications via the first connection using the first RAT and the second connection using the second RAT and without performing tuneaway operations.

In some implementations, the apparatus may include means for receiving a registration message from the first base station. The registration message may indicate that the wireless communication network supports the dual registration mode.

In some implementations, the apparatus may include means for receiving the one or more parameters associated with the DSS from the first base station. The one or more parameters may include a rate matching parameter that indicates the wireless communication network supports the DSS.

Another innovative aspect of the subject matter described in this disclosure can be implemented by a non-transitory computer-readable medium having stored therein instructions which, when executed by a processor of a UE, cause the UE to determine that a wireless communication network supports a dual registration mode and DSS, and establish a first connection with a first base station using a first RAT of the wireless communication network. The first RAT may use a first operating frequency band. The instructions, when executed by the processor of the UE, may further cause the UE to determine, based on one or more parameters associated with the DSS, that a second RAT of the wireless communication network has a second operating frequency band that overlaps the first operating frequency band of the first RAT, and establish, via the second operating frequency band, a second connection with a second base station using the second RAT based on the dual registration mode and the DSS.

In some implementations, the instructions, when executed by the processor of the UE, may cause the UE to operate in a dual receive mode, a dual standby mode, and the dual registration mode using a single radio for wireless communications via the first connection using the first RAT and the second connection using the second RAT.

Another innovative aspect of the subject matter described in this disclosure can be implemented in a wireless communication device, such as a BS or a UE, which includes the above-mentioned apparatus that is configured to perform any of the above-mentioned methods.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5 depicts a flowchart with example operations performed by an apparatus of the UE for performing operations for implementing the dual registration mode and the dual Rx mode based on the DSS using a single radio.

Like reference numbers and designations in the various drawings indicate like elements.

DETAILED DESCRIPTION

Figure 1:
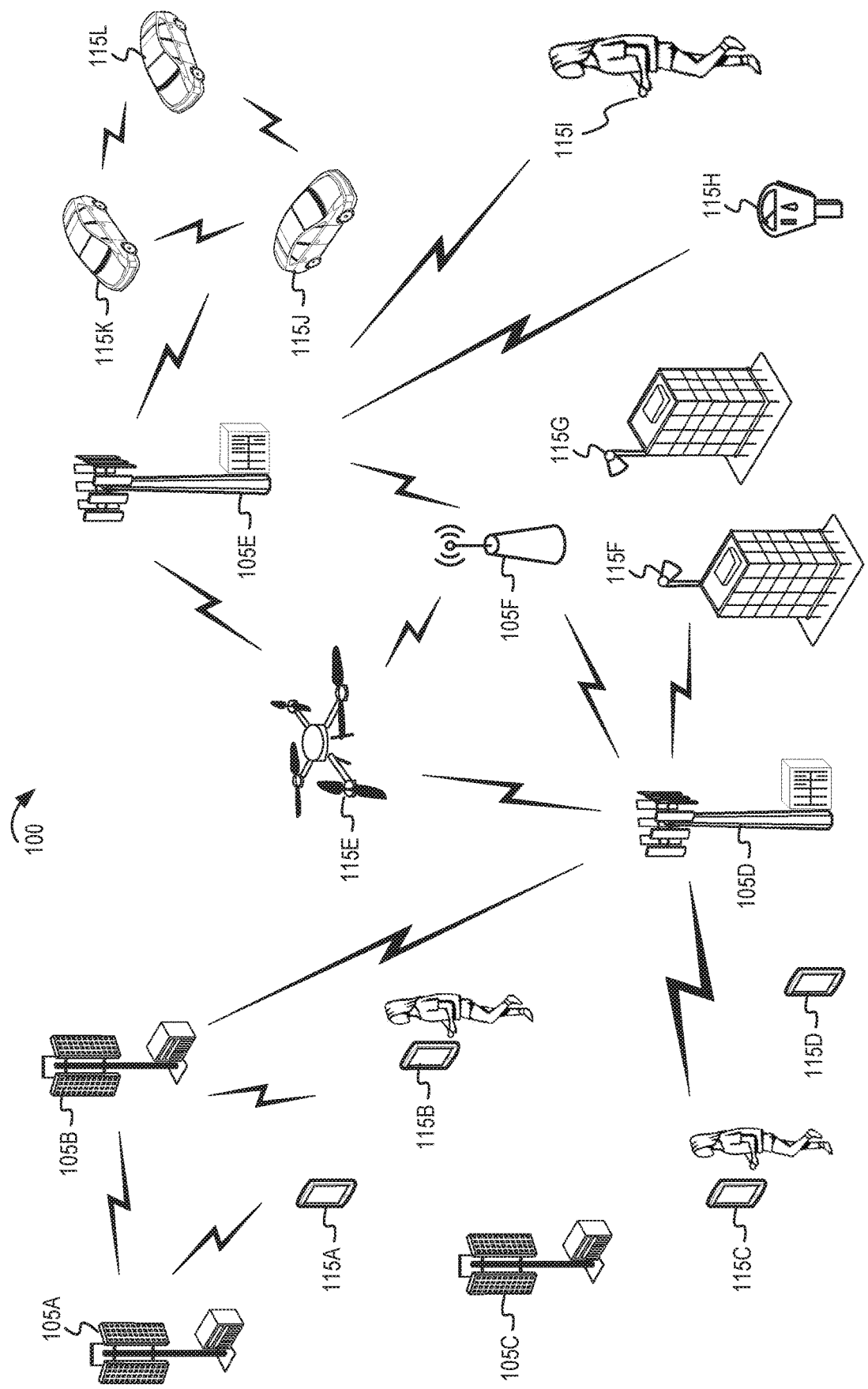
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

An OFDMA network may implement a radio technology such as evolved UTRA (EUTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure relates to the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (such as ~1M nodes/km$_2$), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 ms), and users with wide ranges of mobility or lack thereof; and (3) with enhanced mobile broadband including extreme high capacity (such as ~10 Tbps/km$_2$), extreme data rates (such as multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

A wireless communication network (which also may be referred to as a WAN) may include both a 5G NR radio access technology (RAT) of a 5G NR network and an LTE RAT of an LTE network. A user equipment (UE) of the wireless communication network may use the 5G NR RAT, or the LTE RAT, or both, depending on which wireless coverage is available to the UE. In some implementations, the UEs of the wireless communication network may use the 5G NR RAT for certain types of transmissions (such as data transmissions) and may use the LTE RAT for other types of transmissions (such as voice transmissions). Thus, 5G NR has a provision that allows a UE to operate in a dual registration mode. In a dual registration mode, the UE can simultaneously establish a connection with both a 5G NR RAT and an LTE RAT. This also may be referred to as simultaneously attaching to both a 5G NR RAT and an LTE RAT.

A UE may use a single receive (Rx) mode while operating in the dual registration mode. The single Rx mode may use a single radio and may operate the 5G NR and the LTE in a dual standby mode, where both the 5G NR and the LTE are ready to be used by the UE. However, when operating in the single Rx mode during the dual registration mode, the UE typically has to perform a tuneaway operation to monitor the LTE communications in the LTE RAT. When performing the tuneaway operation, the UE stops receiving 5G NR communications (which may be referred to as tuning away from the 5G NR RAT) in order to use the radio to monitor and receive LTE communications (such as periodic LTE page signals) from the LTE RAT. Thus, performing the tuneaway operation typically results in throughput loss and data loss in the 5G NR connection to the 5G NR RAT.

A UE may use a dual Rx mode while operating in the dual registration mode. The dual Rx mode may use two different radios to receive the 5G NR and LTE communications simultaneously while operating in a dual standby mode. However, the dual RX mode that uses two different radios is less cost effective. Also, some UEs in the wireless communication network (such as some mobile devices, sensors, or other types of IoTs) may not include two different radios, or may use too much power when using two radios.

In some implementations, a UE may implement dynamic spectrum sharing (DSS) while operating in a dual registration mode to achieve a dual Rx mode of operation using a single radio and without having to perform tuneaway operations. When the UE operates in the dual registration mode, the UE may use aspects of DSS to enable the UE to operate in a dual Rx mode and receive both 5G NR and LTE communications simultaneously using a single radio and without performing tuneaway operations. In some implementations, when the wireless communication network supports a dual registration mode and DSS, the UE may determine an LTE frequency band that overlaps the 5G NR frequency band based on a rate matching parameter associated with the DSS. Since the LTE frequency band is a subset of the 5G NR frequency band, when the UE monitors, processes, and decodes a broadband signal in the 5G NR frequency band that may include both 5G NR and LTE signals, the UE can simultaneously monitor, process, and decode both the 5G NR signals and LTE signals without having to perform tuneaway operations. In some implementations, after the UE receives both 5G NR and LTE signals concurrently using a single radio, the UE may provide the 5G NR information to a 5G NR processing unit and the LTE information to a LTE processing unit for separate processing.

Particular implementations of the subject matter described in this disclosure can be implemented to realize one or more of the following potential advantages. Operating in a dual registration mode and a dual Rx mode based on DSS using a single radio and without having to perform tuneaway operations may eliminate the throughput and data loss associated with the tuneaway operations that are performed by the UE when operating in a dual registration mode and single Rx mode using a single radio. Also, operating in a dual registration mode and a dual Rx mode based on DSS using a single radio may provide UE design flexibility, power savings, and cost savings by allowing UEs to operate using a single radio compared to UEs that use two separate radios in a dual registration mode and dual Rx mode. Furthermore, operating in a dual registration mode and a dual Rx mode based on DSS using a single radio and without having to perform tuneaway operations may improve coexistence between 5G NR and LTE RATs.

FIG. 1 is a system diagram of an example wireless communication network 100. The wireless communication network 100 may be an LTE network or a 5G NR network, or a combination thereof. The wireless communication network 100 includes a number of base stations (BSs) 105 (individually labeled as 105A, 105B, 105C, 105D, 105E, and 105F) and other network entities. A BS 105 may be a station that communicates with UEs 115 and also may be referred to as an evolved node B (eNB), a next generation eNB (gNB), an access point, and the like. In some implementations, a BS 105 may represent an eNB of an LTE network or a gNB of a 5G NR network, or a combination thereof. Each BS 105 may provide communication coverage for a particular geographic area. In 3GPP, the term "cell" can refer to this particular geographic coverage area of a BS 105 or a BS subsystem serving the coverage area, depending on the context in which the term is used.

A BS 105 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). ABS for a macro cell may be referred to as a macro BS. ABS for a small cell may be referred to as a small cell BS, a pico BS, a femto BS or a home BS. In the example shown in FIG. 1, the BSs 105D and 105E may be regular macro BSs, while the BSs 105A-105C may be macro BSs enabled with three dimensions (3D), full dimensions (FD), or massive MIMO. The BSs 105A-105C may take advantage of their higher dimension MIMO capabilities to exploit 3D beamforming in both elevation and azimuth beamforming to increase coverage and capacity. The BS 105F may be a small cell BS which may be a home node or portable access point. A BS 105 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless communication network 100, and each UE 115 may be stationary or mobile. A UE 115 also may be referred to as a terminal, a mobile station, a wireless device, a subscriber unit, a station, or the like. A UE 115 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 115 may be a device that includes a Universal Integrated Circuit Card (UICC). In another aspect, a UE may be a device that does not include a UICC. In some aspects, the UEs 115 that do not include UICCs also may be referred to as IoT devices or internet of everything (IoE) devices. The UEs 115A-115D are examples of mobile smart phone-type devices that may access the wireless communication network 100. A UE 115 also may be a machine specifically configured for connected communication, including machine type communication (MTC), enhanced MTC (eMTC), narrowband IoT (NB-IoT), and the like. The UEs 115E-115L are examples of various machines configured for communication that access the wireless communication network 100. A UE 115 may be able to communicate with any type of the BSs, whether macro BS, small cell, or the like. In FIG. 1, a lightning bolt is representative of a communication link that indicates wireless transmissions between a UE 115 and a serving BS 105, which is a BS designated to serve the UE 115 on the downlink and uplink, or desired transmission between BSs, and backhaul transmissions between BSs.

In operation, the BSs 105A-105C may serve the UEs 115A and 115B using 3D beamforming and coordinated spatial techniques, such as coordinated multipoint (CoMP) or multi-connectivity. The macro BS 105D may perform backhaul communications with the BSs 105A-105C, as well as the BS 105F (which may be a small cell BS). The macro BS 105D also may transmit multicast services which are subscribed to and received by the UEs 115C and 115D. Such multicast services may include mobile television or stream video, or may include other services for providing community information, such as weather emergencies or alerts, such as Amber alerts or gray alerts.

The BSs 105 also may communicate with a core network. The core network may provide user authentication, access authorization, tracking, Internet Protocol (IP) connectivity, and other access, routing, or mobility functions. At least some of the BSs 105 (such as a gNB or an access node controller (ANC)) may interface with the core network through backhaul links (such as NG-C and NG-U) and may perform radio configuration and scheduling for communication with the UEs 115. In various examples, the BSs 105 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 115E, which may be a drone. Redundant communication links with the UE 115E may include links from the macro BSs 105D and 105E, as well as links from the small cell BS 105F. Other machine type devices, such as the UE 115F and UE 115G (such as video cameras or smart lighting), the UE 115H (such as a smart meter), and UE 115I (such as a wearable device) may communicate through the wireless communication network 100 either directly with the BSs, such as the small cell BS 105F, and the macro BS 105E, or in multi-hop configurations by communicating with another user device which relays its information to the wireless communication network 100. For example, the UE 115H may communicate smart meter information to the UE 115I (such as a wearable device or mobile phone), which may then report to the wireless communication network 100 through the small cell BS 105F. The wireless communication network 100 also may provide additional network efficiency through dynamic, low-latency TDD/FDD communications, such as in vehicle-to-vehicle (V2V) communications, as shown by UEs 115J-115L.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 105 may assign or schedule transmission resources (such as in the form of time-frequency resource blocks (RB)) for downlink (DL) and uplink (UL) transmissions in the wireless communication network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell-specific reference signals (CRSs) or channel state information reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 105 can transmit synchronization signals, including a primary synchronization signal (PSS) and a secondary synchronization signal (SSS), in the wireless communication network 100 to facilitate synchronization. The BSs 105 can broadcast system information associated with the wireless communication network 100 (such as a master information block (MIB), remaining system information (RMSI), and other system information (OSI)) to facilitate initial network access. In some instances, the BSs 105 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 115 attempting to access the wireless communication network 100 may perform an initial cell search by detecting a PSS included in an SSB from a BS 105. The PSS may enable synchronization of period timing and may indicate a physical layer identity value. The UE 115 may then receive an SSS included in an SSB from the BS 105. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive an MIB. The MIB may include system information for initial network access and scheduling information for at least one of an RMSI and OSI. After decoding the MIB, the UE 115 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 115 can perform a random access procedure to establish a connection with the BS 105. In some examples, the random access procedure may be a four-step random access procedure. For example, the UE 115 may transmit a physical random access channel (PRACH), such as a PRACH preamble, and the BS 105 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 115 may transmit a connection request to the BS 105 and the BS 105 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a PRACH (including a PRACH preamble) and a connection request in a single transmission and the BS 105 may respond by transmitting a RAR and a connection response in a single transmission.

After establishing a connection, the UE 115 and the BS 105 can enter a normal operation stage, where operational data may be exchanged. For example, the BS 105 may schedule the UE 115 for UL and DL communications. The BS 105 may transmit UL and DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 105 may dynamically assign a UE 115 to operate over a certain BWP. The assigned BWP may be referred to as the active BWP. The UE 115 may monitor the active BWP for signaling information from the BS 105. The BS 105 may schedule the UE 115 for UL or DL communications in the active BWP. In some implementations, the BS 105 may configure UEs 115 with narrowband operation capabilities (such as with transmission and reception limited to a BW of 20 MHz or less) to perform BWP hopping for channel monitoring and communications.

In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (such as UL or DL scheduling grants) from the BS 105. For example, the BS 105 may configure the UE 115 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (such as a preamble signal sequence) is detected in the channel.

Figure 2:
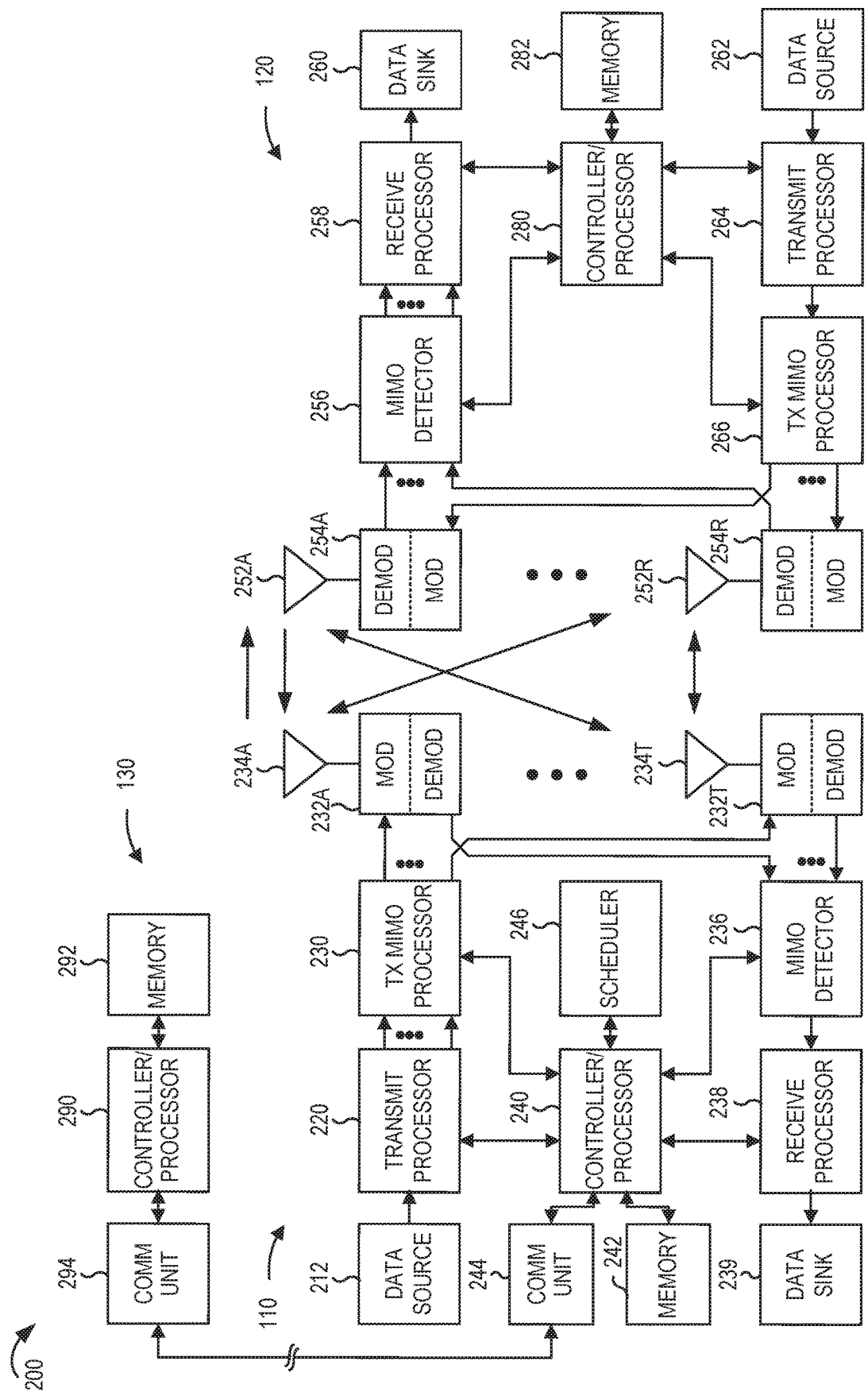
FIG. 2 is a block diagram conceptually illustrating an example base station (BS) in communication with a user equipment (UE).

FIG. 2 is a block diagram conceptually illustrating an example 200 of a base station 110 in communication with a UE 120. In some aspects, base station 110 and UE 120 may respectively be one of the base stations and one of the UEs in wireless communication network 100 of FIG. 1. Base station 110 may be equipped with T antennas 234A through 234T, and UE 120 may be equipped with R antennas 252A through 252R, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from base station 110 or other base stations and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to base station 110. At base station 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and may communicate to network controller 130 via communication unit 244. The network controller 130 may include communication unit 294, a controller or processor (i.e., controller/processor) 290, and memory 292.

The controller/processor 240 of base station 110, the controller/processor 280 of UE 120, or any other component(s) of FIG. 2 may perform one or more techniques associated with implementing a dual registration mode and a dual receive (Rx) mode based on DSS using a single radio, as described in more detail elsewhere herein. For example, the controller/processor 240 of base station 110, the controller/processor 280 of UE 120, or any other component(s) (or combinations of components) of FIG. 2 may perform or direct operations of, for example, the process depicted by flowchart 500 of FIG. 5, or other processes as described herein, such as the processes described in FIGS. 3 and 4. The memories 242 and 282 may store data and program codes for base station 110 and UE 120, respectively. A scheduler 246 may schedule UEs for data transmission on the downlink, the uplink, or a combination thereof.

Figure 3:
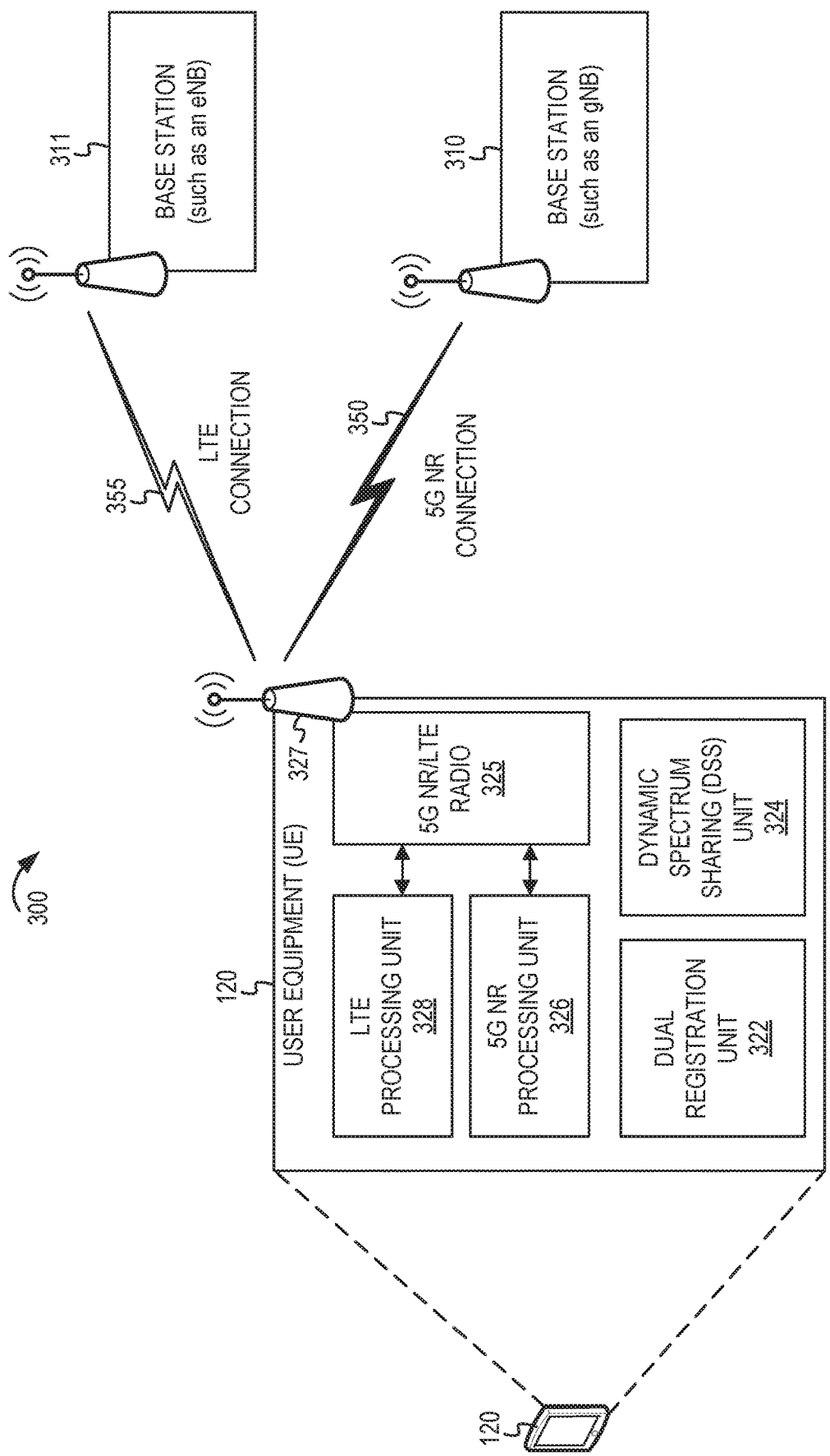
FIG. 3 shows a system diagram of an example wireless communication network including a UE, a BS of a 5G NR network, and a BS of an LTE network configured to implement a dual registration mode and a dual receive (Rx) mode based on dynamic spectrum sharing (DSS) using a single radio.
Figure 4:
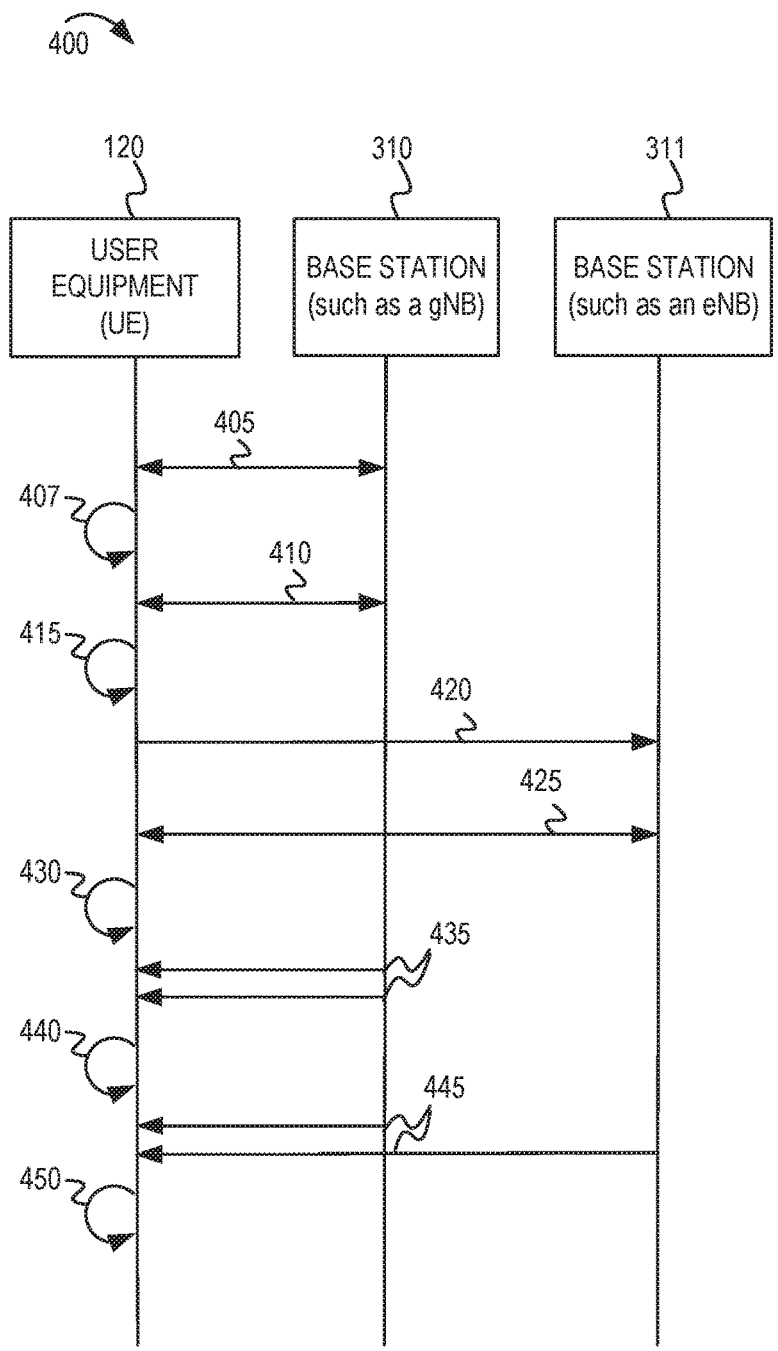
FIG. 4 shows an example message flow that shows the UE, the BS of a 5G NR network, and the BS of the LTE network performing operations for implementing the dual registration mode and the dual Rx mode based on the DSS using a single radio.

The stored program codes, when executed by the controller/processor 280 or other processors and modules at UE 120, may cause the UE 120 to perform operations described with respect to the process depicted by flowchart 500 of FIG. 5, or other processes as described herein, such as the processes described in FIGS. 3 and 4. The stored program codes, when executed by the controller/processor 240 or other processors and modules at base station 110, may cause the base station 110 to perform operations described with respect to the process depicted by flowchart 500 of FIG. 5, or other processes as described herein, such as the processes described in FIGS. 3 and 4. A scheduler 246 may schedule UEs for data transmission on the downlink, the uplink, or a combination thereof.

In some aspects, UE 120 may include means for performing the process depicted by flowchart 500 of FIG. 5, or other processes as described herein, such as the processes described in FIGS. 3 and 4. In some aspects, such means may include one or more components of UE 120 described in connection with FIG. 2.

In some aspects, base station 110 may include means for performing the process depicted by flowchart 500 of FIG. 5, or other processes as described herein, such as the processes described in FIGS. 3 and 4. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

FIG. 3 shows a system diagram of an example wireless communication network including a UE, a BS of a 5G NR network, and a BS of an LTE network configured to implement a dual registration mode and a dual receive (Rx) mode based on DSS using a single radio. The wireless communication network 300 shown in FIG. 3 is based on the example wireless communication network 100 described in FIG. 1. The wireless communication network 300 may include a UE 120, a BS 310, and a BS 311. The UE 120 may be an example implementation of the UE 115 shown in FIG. 1 and the UE 120 shown in FIG. 2. The BS 310 and the BS 311 may each be an example implementation of a BS 105 shown in FIG. 1 and a BS 110 shown in FIG. 2. Although not shown for simplicity, the wireless communication network 300 may include one or more additional BSs and one or more additional UEs. In some implementations, the BS 310 may be a gNB that can implement a 5G NR radio access technology (RAT) described in this disclosure to manage communications of a 5G NR network. In some implementations, the BS 311 may be an eNB that can implement an LTE RAT described in this disclosure to manage communications of an LTE network. The 5G NR network and the LTE network may be part of the wireless communication network 300.

In some implementations, the UE 120 may include a dual registration unit 322 and a DSS unit 324. The UE 120 also may include a 5G NR/LTE radio 325, one or more antennas 327, a 5G NR processing unit 326, and an LTE processing unit 328. The dual registration unit 322 may perform dual registration operations to implement the dual registration mode in accordance with aspects of this disclosure. The DSS unit 324 may perform DSS operations to implement DSS during a dual registration mode in accordance with aspects of this disclosure. The 5G NR/LTE radio 325 may receive LTE and 5G NR communications via the one or more antennas 327 when the UE 120 is operating in the dual registration mode based on DSS, and the 5G NR RAT and the LTE RAT are using an overlapping frequency band. The 5G NR/LTE radio 325 may provide the 5G NR communications to the 5G NR processing unit 326 and may provide the LTE communications to the LTE processing unit 328. In some implementations, the dual registration unit 322, the DSS unit 324, the 5G NR/LTE radio 325, the 5G NR processing unit 326, and the LTE processing unit 328 may perform operations to implement the dual registration mode and the dual Rx mode based on DSS using a single radio (such as the 5G NR/LTE radio 325), as described further herein.

Although not shown for simplicity, the BS 310 also may include a dual registration unit and a DSS unit. In some implementations, the 5G NR/LTE radio 325, the 5G NR processing unit 326, the LTE processing unit 328, the dual registration unit 322, and the DSS unit 324 may be implemented by the UE 120 using one or more of the components shown in FIG. 2 for the UE 120, such as the MODs-DEMODs 254A through 254R, the controller/processor 280, the memory 282, and the receive processor 258. The 5G NR/LTE radio 325 also may be referred to as an interface or a network interface that can receive 5G NR and LTE communications from the wireless communication network 300.

The UE 120 may perform operations to establish a 5G NR connection and an LTE connection with the wireless communication network 300. In some implementations, the UE 120 may determine whether the wireless communication network 300 supports a dual registration mode. For example, the UE 120 may receive a registration message from the BS 310 that indicates the wireless communication network 300 supports the dual registration mode. The registration message may be a registration accept message that includes a dual registration indication information element (IE) that indicates the wireless communication network 300 supports the dual registration mode. For example, the dual registration indication IE may be one or more bits of a field or subfield of the registration accept message.

In some implementations, the UE 120 may establish a 5G NR connection 350 (which also may be referred to as a 5G NR communication link) with the BS 310 using the 5G NR RAT after determining the wireless communication network 300 supports the dual registration mode. In some implementations, if the UE 120 supports DSS, the UE 120 also may determine whether the wireless communication network 300 supports DSS. For example, after establishing the 5G NR connection 350 with the BS 310, the UE 120 may receive one or more parameters that indicate the wireless communication network 300 supports DSS. In some implementations, the UE 120 may receive an LTE cell-specific reference signal (CRS) rate matching parameter (which also may be referred to as a rate matching parameter) that indicates the wireless communication network 300 supports DSS. The LTE CRS rate matching parameter may indicate an operating frequency band for LTE that overlaps the operating frequency band for 5G NR, and a center frequency associated with the overlapping LTE frequency band. The LTE CRS rate matching parameter also may indicate one or more CRS port numbers. For example, the LTE CRS rate matching parameter may be the RateMatchPatternLTE-CRS IE that may include the carrierFreqDL parameter, the carrierBandwidthDL parameter, and the nrofCRS-Ports parameter. The UE 120 can use the overlapping frequency band, the center frequency, and the one or more CRS port numbers to detect LTE communications from the LTE RAT when operating in the dual registration mode using DSS. The operating frequency band used by the 5G NR RAT may be referred to as a first operating frequency band or the 5G NR operating frequency band. The operating frequency band of the LTE RAT that overlaps the 5G NR frequency band may be referred to as a second operating frequency band, the LTE frequency band, or the overlapping LTE frequency band. For example, the operating frequency band of the LTE RAT that overlaps the 5G NR frequency band may be a subset of the 5G NR frequency band. The LTE RAT that uses the overlapping frequency band also may use the same radio channel as the 5G NR RAT.

In some implementations, after determining the overlapping LTE frequency band from the LTE CRS rate matching parameter, the UE 120 may search for the LTE network (which also may be referred to as searching for the LTE cell or the LTE RAT connection) using the overlapping LTE frequency band. For example, the UE 120 may search for the LTE network using the E-UTRA (evolved universal mobile telecommunication system (UMTS) terrestrial radio access) absolute radio frequency channel number (EARFCN) associated with the overlapping LTE frequency band. In some implementations, after searching and finding the LTE network, the UE 120 may establish an LTE connection 355 (which also may be referred to as an LTE communication link) with the BS 311 using the LTE RAT via the overlapping LTE frequency band. For example, the UE 120 and the BS 311 may establish the LTE connection 355 by exchanging radio resource control (RRC) messages. The UE 120 establishing the LTE connection 355 using RRC messages also may be referred to as establishing an LTE RRC connection. In some implementations, the UE 120 may use the center frequency associated with the overlapping LTE frequency band to search for and establish the LTE connection 355 with the BS 311.

In some implementations, after establishing the LTE connection 355, the BS 311 of the LTE network may move the UE 120 to an idle mode with respect to the LTE network. For example, the BS 311 may move the UE 120 to the idle mode (which also may be referred to as an RRC idle mode) by releasing the LTE RRC connection. In some implementations, the UE 120 may operate in an idle mode for the LTE connection 355 associated with the LTE network, and may operate in an idle mode or a connected mode for the 5G NR connection 350 associated with the 5G NR network.

In some implementations, when operating in the dual registration mode based on DSS using a single radio, the UE 120 may receive a broadband signal that includes both 5G NR and LTE information since the LTE frequency band overlaps the 5G NR frequency band. For example, the broadband signal may include a 5G NR communication received via the 5G NR connection 350 from the BS 310 and an LTE communication received via the LTE connection 355 from the BS 311. In some implementations, the 5G NR/LTE radio 325 of the UE 120 may receive the 5G NR communication from the 5G NR connection 350 and the LTE communication from the LTE connection 355 via the one or more antennas 327. In some implementations, while operating in an idle mode with respect to the LTE connection 355, the UE 120 can monitor the LTE frequency band (which overlaps the 5G NR frequency band), the center frequency associated with the LTE frequency band, and the one or more CRS port numbers that was determined based on the LTE CRS rate matching parameter for LTE communications. For example, the UE 120 can monitor the overlapping LTE frequency band for LTE communications, such as periodic page signals, system information block (SIB) signals, or CRS signals. At the same time the UE 120 monitors the overlapping LTE frequency band for LTE communications, the UE 120 can monitor the 5G NR frequency band for 5G NR communications in order to achieve dual and simultaneous connectivity. Thus, the UE 120 can operate in a dual registration mode, a dual receive mode, and dual standby mode based on DSS using a single radio and without having to perform tuneaway operations. Since the UE 120 is operating in a dual registration mode based on DSS that uses an LTE frequency band that overlaps the 5G NR frequency band, the UE 120 can receive an LTE communication concurrently with a 5G NR communication using a single radio without having to perform tuneaway operations. For example, while receiving 5G NR communications associated with a data transmission, the UE 120 can monitor the overlapping LTE frequency band and receive LTE communications associated with an LTE voice transmission, such as periodic page signals, system information block (SIB) signals, or CRS signals, without having to perform tuneaway operations. For example, while receiving a data transmission via the 5G NR connection 350 and operating in a dual registration mode, the BS 311 of the LTE network may initiate an LTE voice call by sending a page signal via the LTE connection 355.

In some implementations, after the 5G NR/LTE radio 325 of the UE 120 receives the 5G NR communication from the 5G NR connection 350 and the LTE communication from the LTE connection 355, the information from the 5G NR communication may be fed to the 5G NR processing unit 326 and the information from the LTE communication may be fed to the LTE processing unit 328. Since the LTE frequency band overlaps the 5G NR frequency band, when the UE 120 initiates processing and decoding of the 5G NR information received via the 5G NR frequency band (for example, using the 5G NR processing unit 326), the UE 120 also initiates processing and decoding of the LTE information received via the overlapping LTE frequency band (for example, using the LTE processing unit 328). Thus, the UE 120 can efficiently monitor, process, and decode both 5G NR and LTE communications without the throughput and data loss associated with performing tuneaway operations.

FIG. 4 shows an example message flow that shows a UE, a BS of a 5G NR network, and a BS of an LTE network performing operations for implementing a dual registration mode and a dual receive (Rx) mode based on DSS using a single radio. The message flow diagram 400 includes the UE 120, the BS 310, and the BS 311 that are described in FIG. 3.

At 405, the UE 120 and the BS 310 exchange registration messages. For example, the BS 310 may transmit a registration message (such as a registration accept message) to the UE 120 that includes an indication (such as a dual registration indication IE) that the wireless communication network supports a dual registration mode.

At 407, the UE 120 may receive and process the registration message, and may determine that the wireless communication network supports the dual registration mode. At 410, the UE 120 and the BS 310 may exchange additional messages to establish a 5G NR connection between the UE 120 and the BS 310. In some implementations, one of the messages from the BS 310 to the UE 120 may include an LTE CRS rate matching parameter.

At 415, the UE 120 may receive an LTE CRS rate matching parameter that indicates the wireless communication network supports DSS. The LTE CRS rate matching parameter also may indicate an operating frequency band for LTE that overlaps the operating frequency band for 5G NR, and a center frequency associated with the overlapping LTE frequency band.

At 420, the UE 120 may search for the LTE network in the overlapping LTE frequency band. For example, the UE 120 may search for the LTE network using the center frequency associated with the overlapping LTE frequency band.

At 425, after searching and finding the LTE network using the overlapping LTE frequency band, the UE 120 and the BS 311 may exchange messages to establish an LTE connection with the BS 311 of the LTE network.

At 430, after establishing the LTE connection, the UE 120 may transition the LTE connection associated with the LTE RAT to an idle mode. The UE 120 may maintain the 5G NR connection associated with the 5G NR RAT in a connected or idle mode.

At 435, the BS 310 may transit 5G NR information to the UE 120 via the 5G NR connection. At 440, the UE 120 may receive and process the 5G NR information, such as a data transmission. The UE 120 also may monitor the LTE connection in the overlapping LTE frequency band for any LTE communications, such as paging signals. The UE 120 may determine that no LTE communications are detected in the LTE connection.

At 445, the BS 310 may transit additional 5G NR information to the UE 120 via the 5G NR connection, and the BS 311 may transmit LTE information to the UE 120 via the LTE connection. At 450, while operating in the dual registration mode based on DSS, the UE 120 may receive and process the 5G NR information (such as a data transmission) and the LTE information (such as a paging signal) concurrently. The UE 120 may receive and process the 5G NR information and the LTE information concurrently without having to perform tuneaway operations. The UE 120 may continue operating in the dual registration mode, a dual receive mode, and dual standby mode based on DSS using a single radio.

FIG. 5 depicts a flowchart 500 with example operations performed by an apparatus of a UE for performing operations for implementing a dual registration mode and a dual receive (Rx) mode based on DSS using a single radio.

At block 510, the apparatus of the UE may determine that a wireless communication network supports a dual registration mode and DSS.

At block 520, the apparatus of the UE may establish a first connection with a first BS using a first RAT of the wireless communication network. The first RAT may use a first operating frequency band.

At block 530, the apparatus of the UE may determine, based on one or more parameters associated with the DSS, that a second RAT of the wireless communication network has a second operating frequency band that overlaps the first operating frequency band of the first RAT. In some implementations, the first RAT may be a 5G NR network and the second RAT may be an LTE network.

At block 540, the apparatus of the UE may establish, via the second operating frequency band, a second connection with a second base station using the second RAT based on the dual registration mode and the DSS. In some implementations, the UE may operate in a dual Rx mode, a dual standby mode, and the dual registration mode using the single radio for wireless communications via the first connection using the first RAT and the second connection using the second RAT and without performing tuneaway operations.

Figure 6:
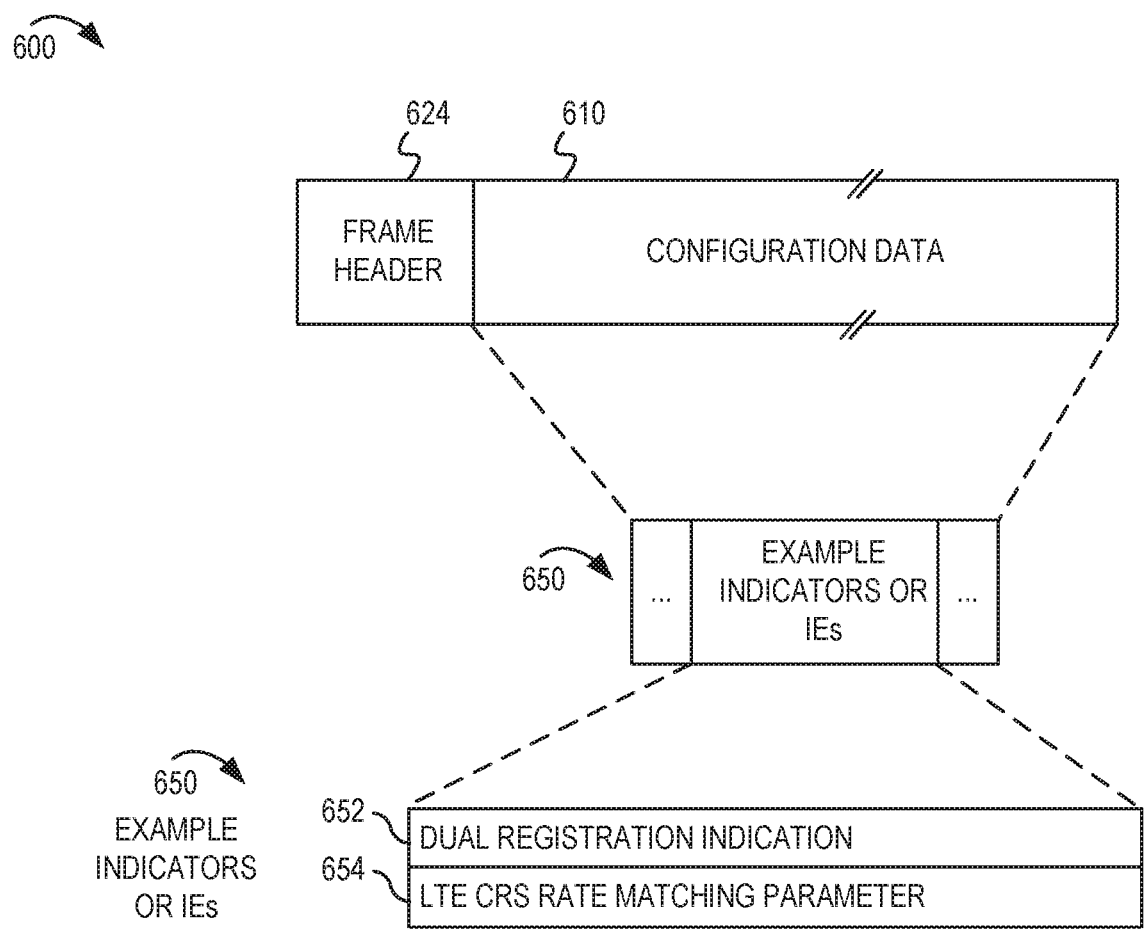
FIG. 6 shows a conceptual diagram of an example configuration message and example configuration information element related to the dual registration mode and the DSS.

FIG. 6 shows a conceptual diagram of an example configuration message 600 and example configuration information element related to the dual registration mode and the DSS. For example, a base station (such as the BS 310 of FIG. 3) may transmit the example configuration message 600 to a UE (such as the UE 120 of FIG. 3). In some implementations, the UE may transmit a similarly formatted reporting message (not shown) with some of the configuration settings described with reference to FIG. 6. The configuration message 600 may include one or more indicators (or information elements (IEs)) that may configure the UE to implement the dual registration mode based on the DSS. The configuration message 600 may include a frame header 624 and configuration data 610. The frame header 624 may indicate the type of configuration information or other frame control information. The configuration data 610 may include a variety of indicators or IEs 650. FIG. 6 includes some example indicators or IEs 650.

In some implementations, the example indicators or IEs 650 may include the dual registration indication 652. The dual registration indication 652 may indicate whether the wireless communication network supports a dual registration mode. The example indicators or IEs 650 also may include an LTE CRS rate matching parameter 654. The LTE CRS rate matching parameter 654 may indicate an operating frequency band for LTE that overlaps the operating frequency band for 5G NR, and a center frequency associated with the overlapping LTE frequency band. The LTE CRS rate matching parameter 654 also may indicate one or more CRS port numbers. In some implementations, the LTE CRS rate matching parameter 654 may be a RateMatchPatternLTE-CRS IE that may include the carrierFreqDL parameter, the carrierBandwidthDL parameter, and the nrofCRS-Ports parameter.

Figure 7:
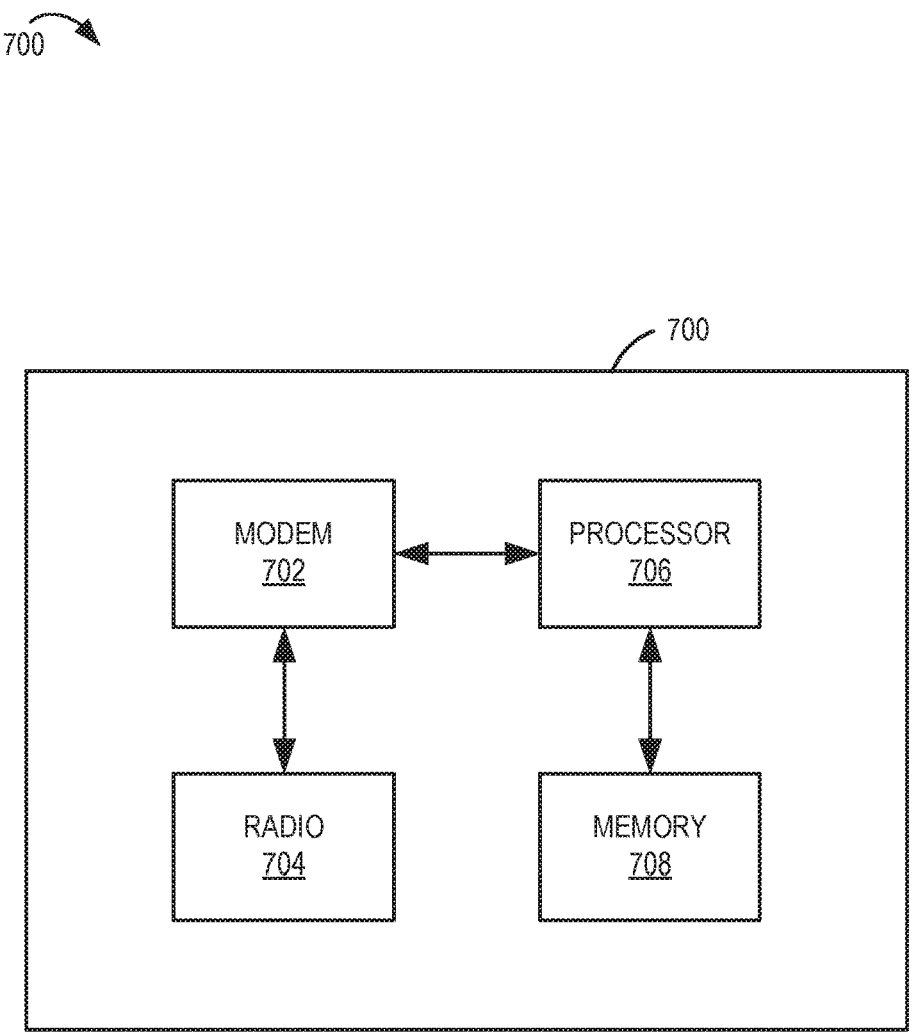
FIG. 7 shows a block diagram of an example wireless communication device.

FIG. 7 shows a block diagram of an example wireless communication device 700. In some implementations, the wireless communication device 700 can be an example of a device or apparatus for use in a UE, such as UE 120 described above with reference to FIG. 3. The wireless communication device 700 is capable of transmitting (or outputting for transmission) and receiving wireless communications.

The wireless communication device 700 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication device 700 may include one or more modems 702. In some implementations, the one or more modems 702 (collectively "the modem 702") may include a WWAN modem (for example, a 3GPP 4G LTE or 5G compliant modem). In some implementations, the wireless communication device 700 also includes one or more radios 704 (collectively "the radio 704"). In some implementations, the wireless communication device 700 further includes one or more processors, processing blocks or processing elements 706 (collectively "the processor 706") and one or more memory blocks or elements 708 (collectively "the memory 708").

The modem 702 can include an intelligent hardware block or device such as, for example, an application-specific integrated circuit (ASIC) among other possibilities. The modem 702 is generally configured to implement a PHY layer. For example, the modem 702 is configured to modulate packets and to output the modulated packets to the radio 704 for transmission over the wireless medium. The modem 702 is similarly configured to obtain modulated packets received by the radio 704 and to demodulate the packets to provide demodulated packets. In addition to a modulator and a demodulator, the modem 702 may further include digital signal processing (DSP) circuitry, automatic gain control (AGC), a coder, a decoder, a multiplexer and a demultiplexer. For example, while in a transmission mode, data obtained from the processor 706 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 704. In implementations involving beamforming, the modulated symbols in the respective spatial streams are precoded via a steering matrix prior to their provision to the IFFT block.

While in a reception mode, digital signals received from the radio 704 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 706) for processing, evaluation, or interpretation.

The radio 704 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 700 can include, or be coupled with, multiple transmit antennas (each with a corresponding transmit chain) and multiple receive antennas (each with a corresponding receive chain). The symbols output from the modem 702 are provided to the radio 704, which then transmits the symbols via the coupled antennas.

Similarly, symbols received via the antennas are obtained by the radio 704, which then provides the symbols to the modem 702.

The processor 706 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 706 processes information received through the radio 704 and the modem 702, and processes information to be output through the modem 702 and the radio 704 for transmission through the wireless medium. In some implementations, the processor 706 may generally control the modem 702 to cause the modem to perform various operations described above.

The memory 708 can include tangible storage media such as random-access memory (RAM) or read-only memory (ROM), or combinations thereof. The memory 708 also can store non-transitory processor- or computer-executable software (SW) code containing instructions that, when executed by the processor 706, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

FIGS. 1-7 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by an apparatus of a user equipment (UE) for wireless communication in a dual receive mode using a single radio, comprising:
   determining that a wireless communication network supports a dual registration mode and dynamic spectrum sharing (DSS);
   establishing a first connection with a first base station using a first radio access technology (RAT) of the wireless communication network, the first RAT using a first operating frequency band;
   determining, based on one or more parameters associated with the DSS, that a second RAT of the wireless communication network has a second operating frequency band that overlaps the first operating frequency band of the first RAT; and
   establishing, via the second operating frequency band, a second connection with a second base station using the second RAT based on the dual registration mode and the DSS.

2. The method of claim 1, wherein the first RAT is a 5G New Radio (NR) network and the second RAT is a long term evolution (LTE) network.

3. The method of claim 1, further comprising:
   operating in the dual receive mode, a dual standby mode, and the dual registration mode using the single radio for wireless communications via the first connection using the first RAT and the second connection using the second RAT.

4. The method of claim 1, further comprising:
   receiving a registration message from the first base station, the registration message indicating that the wireless communication network supports the dual registration mode.

5. The method of claim 4, wherein the registration message is a registration accept message, the registration accept message including a dual registration indication that indicates the wireless communication network supports the dual registration mode.

6. The method of claim 1, wherein determining that the wireless communication network supports the DSS comprises:
   receiving the one or more parameters associated with the DSS from the first base station, the one or more parameters including a rate matching parameter that indicates the wireless communication network supports the DSS.

7. The method of claim 6, wherein the rate matching parameter is an LTE cell-specific reference signal (CRS) rate matching parameter that indicates the wireless communication network supports the DSS and indicates the second operating frequency band of the second RAT.

8. The method of claim 6, wherein establishing the second connection with the second base station using the second RAT based on the dual registration mode and the DSS comprises:
   determining the second operating frequency band and a center frequency of the second operating frequency band based on the rate matching parameter; and
   searching for the center frequency of the second operating frequency band for establishing the second connection.

9. The method of claim 1, further comprising:
   operating in an idle mode or a connected mode for the first connection that uses the first RAT; and
   operating in an idle mode for the second connection that uses the second RAT.

10. The method of claim 1, further comprising:
   receiving a first communication associated with the first RAT from the first base station via the first connection having the first operating frequency band;
   receiving a second communication associated with the second RAT from the second base station via the second connection having the second operating frequency band;
   processing the first communication using a first processing unit associated with the first RAT; and
   processing the second communication using a second processing unit associated with the second RAT.

11. The method of claim 10, further comprising:
   operating in an idle mode or a connected mode for the first connection that uses the first RAT;
   operating in an idle mode for the second connection that uses the second RAT; and
   receiving the second communication associated with the second RAT without performing a tuneaway operation.

12. The method of claim 10, further comprising:
   operating in an idle mode or a connected mode for the first connection that uses the first RAT;
   operating in an idle mode for the second connection that uses the second RAT; and
   receiving the first communication associated with the first RAT concurrently with the second communication associated with the second RAT without performing a tuneaway operation.

13. The method of claim 10, wherein the first RAT is a 5G New Radio (NR) network and the second RAT is a long term evolution (LTE) network, further comprising:
   operating in an idle mode or a connected mode for the first connection that uses the 5G NR network;
   operating in an idle mode for the second connection that uses the LTE network; and
   determining the second communication is an LTE page signal or an LTE cell-specific reference signal (CRS).

14. An apparatus of a user equipment (UE) for wireless communication, comprising:
an interface; and
one or more processors, which together with the interface, are configured to:
determine that a wireless communication network supports a dual registration mode and dynamic spectrum sharing (DSS);
establish a first connection with a first base station using a first radio access technology (RAT) of the wireless communication network, the first RAT using a first operating frequency band;
determine, based on one or more parameters associated with the DSS, that a second RAT of the wireless communication network has a second operating frequency band that overlaps the first operating frequency band of the first RAT; and
establish a second connection with a second base station using the second RAT based on the dual registration mode and the DSS, the second RAT using the second operating frequency band.

15. The apparatus of claim 14, wherein the interface includes a single radio, and the apparatus is configured to operate in a dual receive mode, a dual standby mode, and the dual registration mode using the single radio for wireless communications via the first connection using the first RAT and the second connection using the second RAT.

16. The apparatus of claim 14, wherein the first RAT is a 5G New Radio (NR) network and the second RAT is a long term evolution (LTE) network.

17. The apparatus of claim 14, wherein the one or more processors, together with the interface, are further configured to:
receive a registration message from the first base station, the registration message indicating that the wireless communication network supports the dual registration mode.

18. The apparatus of claim 17, wherein the registration message is a registration accept message, the registration accept message including a dual registration indication that indicates the wireless communication network supports the dual registration mode.

19. The apparatus of claim 14, wherein the one or more processors, together with the interface, are further configured to:
receive the one or more parameters associated with the DSS from the first base station, the one or more parameters including a rate matching parameter that indicates the wireless communication network supports the DSS.

20. The apparatus of claim 19, wherein the rate matching parameter is an LTE cell-specific reference signal (CRS) rate matching parameter that indicates the wireless communication network supports the DSS and indicates the second operating frequency band of the second RAT.

21. The apparatus of claim 19, wherein the one or more processors, together with the interface, are further configured to:
determine the second operating frequency band and a center frequency of the second operating frequency band based on the rate matching parameter; and
search for the center frequency of the second operating frequency band to establish the second connection.

22. The apparatus of claim 14, wherein the one or more processors, together with the interface, are further configured to:
operate in an idle mode or a connected mode for the first connection that uses the first RAT; and
operate in an idle mode for the second connection that uses the second RAT.

23. The apparatus of claim 14, wherein the one or more processors, together with the interface, are further configured to:
receive a first communication associated with first RAT from the first base station via the first connection having the first operating frequency band;
receive a second communication associated with the second RAT from the second base station via the second connection having the second operating frequency band;
process the first communication associated with the first RAT; and
process the second communication associated with the second RAT.

24. The apparatus of claim 23, wherein the one or more processors, together with the interface, are further configured to:
operate in an idle mode or a connected mode for the first connection that uses the first RAT;
operate in an idle mode for the second connection that uses the second RAT; and
receive the first communication associated with the first RAT concurrently with the second communication associated with the second RAT without performing a tuneaway operation.

25. An apparatus for wireless communication, comprising:
means for determining that a wireless communication network supports a dual registration mode and dynamic spectrum sharing (DSS);
means for establishing a first connection with a first base station using a first radio access technology (RAT) of the wireless communication network, the first RAT using a first operating frequency band;
means for determining, based on one or more parameters associated with the DSS, that a second RAT of the wireless communication network has a second operating frequency band that overlaps the first operating frequency band of the first RAT; and
means for establishing, via the second operating frequency band, a second connection with a second base station using the second RAT based on the dual registration mode and the DSS.

26. The apparatus of claim 25, further comprising:
means for operating in a dual receive mode, a dual standby mode, and the dual registration mode using a single radio for wireless communications via the first connection using the first RAT and the second connection using the second RAT and without performing tuneaway operations.

27. The apparatus of claim 25, further comprising:
means for receiving a registration message from the first base station, the registration message indicating that the wireless communication network supports the dual registration mode.

28. The apparatus of claim 25, further comprising:
means for receiving the one or more parameters associated with the DSS from the first base station, the one or more parameters including a rate matching parameter that indicates the wireless communication network supports the DSS.

29. A non-transitory computer-readable medium having stored therein instructions which, when executed by a processor of a user equipment (UE), cause the UE to:
- determine that a wireless communication network supports a dual registration mode and dynamic spectrum sharing (DSS);
- establish a first connection with a first base station using a first radio access technology (RAT) of the wireless communication network, the first RAT using a first operating frequency band;
- determine, based on one or more parameters associated with the DSS, that a second RAT of the wireless communication network has a second operating frequency band that overlaps the first operating frequency band of the first RAT; and
- establish, via the second operating frequency band, a second connection with a second base station using the second RAT based on the dual registration mode and the DSS.

30. The non-transitory computer-readable medium of claim 29, wherein the instructions, when executed by the processor of the UE, further cause the UE to:
- operate in a dual receive mode, a dual standby mode, and the dual registration mode using a single radio for wireless communications via the first connection using the first RAT and the second connection using the second RAT.

* * * * *